(12) United States Patent
King et al.

(10) Patent No.: US 9,827,668 B2
(45) Date of Patent: Nov. 28, 2017

(54) ROBOTIC JOINT

(71) Applicant: Fetch Robotics, Inc., San Jose, CA (US)

(72) Inventors: Derek King, San Jose, CA (US); Eric Diehr, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 15/130,696

(22) Filed: Apr. 15, 2016

(65) Prior Publication Data

US 2017/0297197 A1 Oct. 19, 2017

(51) Int. Cl.
| | |
|---|---|
| *B25J 19/02* | (2006.01) |
| *G05B 15/00* | (2006.01) |
| *B25J 9/12* | (2006.01) |
| *B25J 17/00* | (2006.01) |
| *H02K 11/21* | (2016.01) |
| *H02K 19/02* | (2006.01) |
| *B25J 9/10* | (2006.01) |
| *G05B 19/404* | (2006.01) |

(52) U.S. Cl.
CPC .............. *B25J 9/126* (2013.01); *B25J 9/104* (2013.01); *B25J 17/00* (2013.01); *B25J 19/02* (2013.01); *H02K 11/21* (2016.01); *H02K 19/02* (2013.01); *G05B 19/404* (2013.01)

(58) Field of Classification Search
None
See application file for complete search history.

(56) References Cited

U.S. PATENT DOCUMENTS

| | | | |
|---|---|---|---|
| 6,428,266 B1 * | 8/2002 | Solomon | B25J 9/042 414/744.1 |
| 2010/0191374 A1 * | 7/2010 | Tsai | G05B 19/404 700/258 |
| 2010/0243344 A1 * | 9/2010 | Wyrobek | B25J 5/007 180/21 |
| 2013/0238127 A1 * | 9/2013 | Ohta | B25J 9/1692 700/254 |

* cited by examiner

*Primary Examiner* — Bentsu Ro
*Assistant Examiner* — Zemenay Truneh
(74) *Attorney, Agent, or Firm* — J. Steven Svoboda

(57) ABSTRACT

A joint includes: a motor coupled to the joint, the motor configured to move the joint; a joint side sensor configured to measure a parameter of interest of a joint side target; a motor side sensor configured to measure the parameter of interest of the motor; and a controller configured to control the motor, the controller operably connected to the joint side sensor, the controller operably connected to the motor side sensor.

22 Claims, 4 Drawing Sheets

ROBOTIC JOINT

PRIORITY CLAIM

The present application claims the priority benefit of U.S. provisional patent application No. 62/147,785 filed Apr. 15, 2015 and entitled "System and Method for Controlling a Robotic Joint," the disclosure of which is incorporated herein by reference.

SUMMARY

Embodiments of this invention relate in general to a joint, and more particularly to a robotic joint, and still more particularly to a robotic rotary joint.

A joint includes: a motor coupled to the joint, the motor configured to move the joint; a joint side sensor configured to measure a parameter of interest of a joint side target; a motor side sensor configured to measure the parameter of interest of the motor; and a controller configured to control the motor, the controller operably connected to the joint side sensor, the controller operably connected to the motor side sensor.

A joint includes: a slipring; a motor coupled to the joint, the motor configured to move the joint, the motor driving a hollow motor side drive shaft; a joint side sensor configured to measure a parameter of interest of a joint side target, the joint side target mounted to a joint side target pulley, the joint side target pulley coupled to a joint side drive shaft, the joint side drive shaft concentrically surrounding the slipring; a motor side sensor configured to measure the parameter of interest of the motor; and a controller configured to control the motor, the controller operably connected to the joint side sensor, the controller operably connected to the motor side sensor, wherein the motor side drive shaft concentrically surrounds the joint side drive shaft.

A joint includes: a motor coupled to the joint, the joint having a central axis, the motor driving a hollow motor side drive shaft via a motor side drive pulley that is operably connected to the motor side drive shaft; a joint side sensor coupled to a joint side target, the joint side sensor configured to sense a parameter of interest, the joint side target mounted to a joint side target pulley, the joint side target pulley coupled to a joint side drive shaft; a motor side sensor coupled to a motor side target that is operably connected to the motor, the motor side sensor configured to sense the parameter of interest, the motor side target being mounted to a motor side target pulley, the motor side target pulley configured to align the motor side target with the motor side sensor, the motor side target pulley coupled to the motor side drive shaft through a motor side pulley belt; and a controller configured to control the motor, the controller operably connected to the joint side sensor, the controller operably connected to the motor side sensor, wherein the motor side drive shaft concentrically surrounds the joint side drive shaft, and wherein the joint side sensor is located on an axis that does not comprise the central axis.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1A:
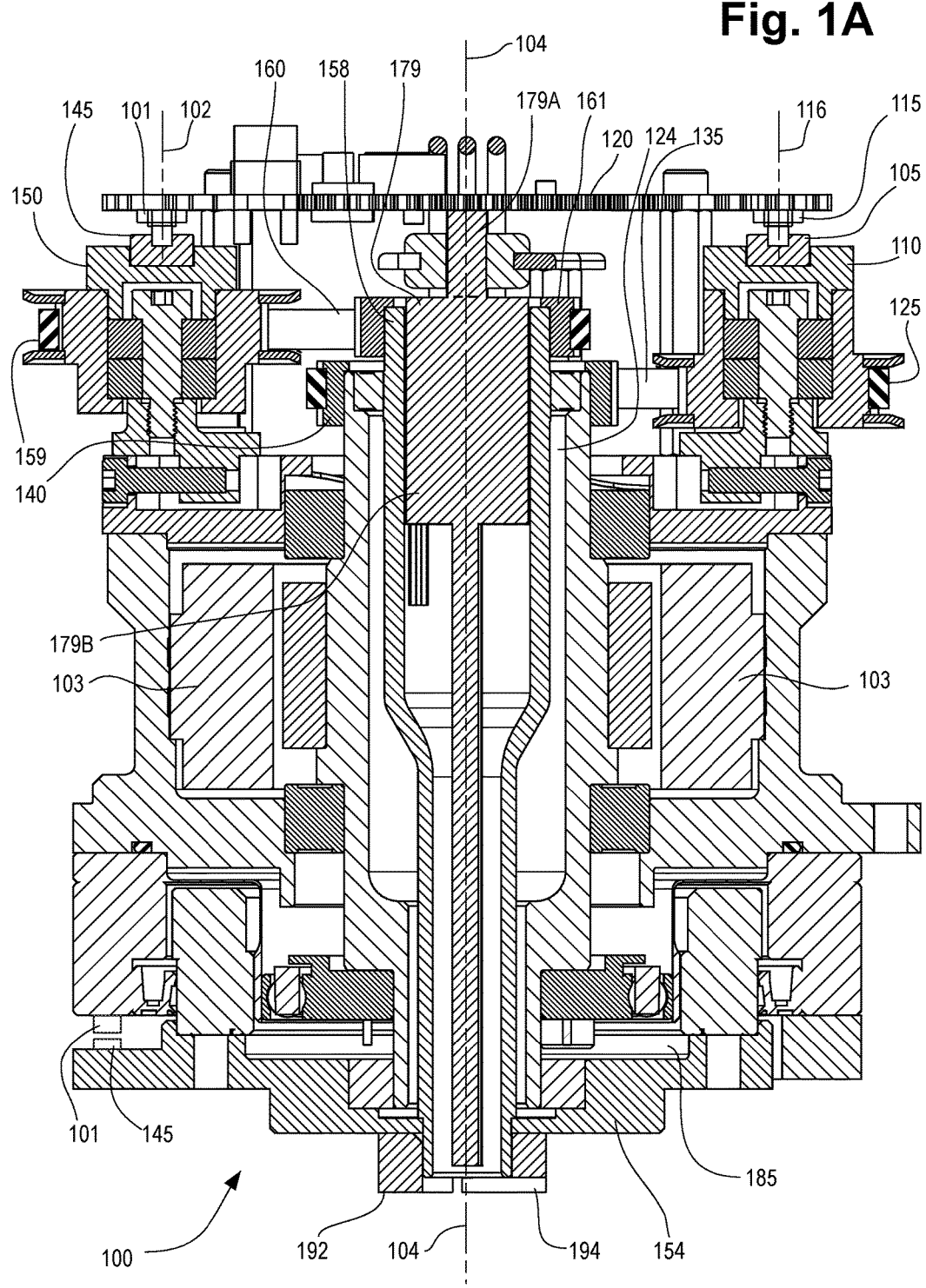
FIG. 1A is a drawing showing a side view of components of a robotic rotary joint in a first embodiment in which a joint side sensor is located on a central axis of the joint.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of this invention relate in general to a joint, and more particularly to a robotic joint, and still more particularly to a robotic rotary joint.

According to embodiments of the invention, a robotic joint can be instrumented so that one or more of a position and a velocity of a motor can be directly measured.

According to further embodiments of the invention, a robotic joint comprises a robotic joint, a motor coupled to the robotic joint, a joint side sensor coupled to the robotic joint, and a motor side sensor coupled to the motor. The joint side sensor may measure position more accurately than the motor side sensor. The motor side sensor may measure one or more of velocity and acceleration more accurately than the joint side sensor. For example, the robotic joint comprises a robotic rotary joint. For example, the motor comprises an electrically actuated motor. For example, the motor comprises a motor other than an electrically actuated motor. For example, the motor comprises a brushless direct current (DC) motor.

According to other embodiments of the invention, the robotic joint further comprises a controller configured to control the motor, the controller operably connected to the joint side sensor, the controller operably connected to the motor side sensor. For example, the joint side sensor measures a position of the robotic joint. Typically, although not necessarily, the position measured by the joint side sensor may be more accurate than a position measured by the motor side sensor. Typically, although not necessarily, the controller may assign greater weight to the position measured by the joint side sensor relative to the position measured by the motor side sensor.

For example, using the position measured by the joint side sensor, the controller calculates a velocity of the joint. For example, the controller calculates the velocity of the robotic joint as the first derivative with respect to time of the position measured by the joint side sensor.

For example, the controller calculates an acceleration of the joint. For example, the controller calculates the acceleration of the robotic joint as a first derivative with respect to time of the velocity of the joint. For example, the controller calculates the acceleration of the robotic joint as a second derivative with respect to time of the position of the joint.

For example, the motor side sensor is coupled to a motor side drive shaft. For example, the motor side sensor is coupled directly to the motor side drive shaft. For example, the controller calculates the velocity of the robotic joint as a first derivative with respect to time of a position measured by the motor side sensor. Typically, although not necessarily, the velocity calculated by the controller based on the position measured by the motor side sensor may be more accurate than a velocity calculated by the controller based on the position measured by the joint side sensor. Typically, although not necessarily, the controller may assign greater weight to the velocity calculated by the motor side sensor relative to the velocity calculated by the joint side sensor.

For example, using one or more of the position measured by the joint side sensor, the position measured by the motor side sensor, the velocity measured by the joint side sensor, and the velocity measured by the motor side sensor, the controller calculates the velocity of the joint.

According to embodiments of the invention, a robotic rotary joint comprises three concentrically positioned components. Proceeding radially outward, these embodiments comprise a slipring, surrounded by a joint side drive shaft, surrounded by a hollow motor side drive shaft, all rotating about a central axis of the joint.

According to embodiments of the invention, the joint side sensor and the motor side sensor both require two pulleys: a drive pulley and a target pulley. For the joint side and the motor side, a respective belt couples motion of the respective drive pulley to the respective target pulley. The respective drive pulley moves the respective target pulley, thereby moving the respective target, which is sensed by the respective sensor. Each pulley pair—a motor side target pulley combined with a motor side drive pulley, and a joint side target pulley combined with a joint side drive pulley—effectively moves a center of rotation so it can be measured with a respective sensor that is not located on the central axis of the joint but rather is located on a respective side axis. That is, the motor side target pulley and the motor side drive pulley are used to effectively move a center of rotation of the motor so the motor can be measured with a motor side sensor that is not located on the central axis of the joint but rather is located on the motor side axis. Similarly, the joint side target pulley and the joint side drive pulley are used to effectively move a center of rotation of the joint side output plate so that a joint position can be measured with a joint side sensor that is not located on the central axis of the joint but rather is located on the joint side axis.

FIG. 1A is a drawing showing a side view of components of a robotic rotary joint 100 in an embodiment in which a joint side sensor 101 is located on a joint side axis 102 of the joint 100. The joint side sensor 101 is configured to sense a parameter of interest. For example, the parameter of interest comprises one or more of a position of the joint 100, a velocity of the joint 100, an acceleration of the joint 100, and another parameter of interest.

The joint 100 further comprises a motor 103 that rotates about a central axis 104 of the joint 100. The joint 100 further comprises a motor side target 105 that is operably connected to the motor 103. The motor side target 105 is held in place by a motor side target holder 110. For example, the motor side target 105 comprises a motor side magnet 105. For example, the motor side target 105 comprises a motor side optical target 105. For example, the motor side target 105 comprises a motor side capacitive target 105. For example, the motor side target 105 comprises a motor side resolver target 105.

As the motor side target 105 moves, its position and therefore its velocity are detected by a motor side sensor 115 located on a motor side axis 116 of the joint 100. Accordingly, the motor side sensor 115 is not located on the central axis 104. The motor side sensor 115 is configured to detect the parameter of interest.

For example, the motor side sensor 115 comprises a motor side position sensor 115. For example, the motor side sensor 115 comprises a motor side absolute position sensor 115. For example, the motor side sensor 115 comprises a motor side magnetic sensor 115. For example, the motor side sensor 115 comprises a motor side absolute magnetic position sensor 115. For example, the motor side sensor 115 comprises one or more of a motor side optical sensor 115, a motor side magnetic sensor 115, a motor side capacitive sensor 115, and a motor side resolver 115.

For example, the motor side sensor 115 comprises a motor side position sensor 115. For example, the motor side sensor 115 comprises a motor side absolute position sensor 115. For example, the motor side sensor 115 comprises a motor side magnetic sensor 115. For example, the motor side sensor 115 comprises a motor side absolute magnetic position sensor 115.

The motor side sensor 115 is operably connected to a controller 120. For example, the motor side sensor 115 is mounted on the controller 120. The controller 120 is configured to control the motor 103.

The motor 103 drives a motor side drive shaft 124. The motor side target 105 is mounted to a motor side target pulley 125. For example, the motor side target pulley 125 is configured to align the motor side target 105 with the motor side sensor 115. The motor side target pulley 125 is coupled to the motor side drive shaft 124 through a motor side pulley belt 135, which is driven by a motor side drive pulley 140 that is operably connected to the motor side drive shaft 124. The motor side target pulley 125 is configured to bring the motor side target 105 into detection range of the motor side sensor 115.

For example, the motor side pulley belt 135 is configured so that when the motor side pulley belt 135 is tensioned, the motor side target 105 aligns directly below the motor side sensor 115. For example, the motor side pulley belt 135 is sized so that when the motor side pulley belt 135 is tensioned, the motor side target 105 aligns directly below the motor side sensor 115. This alignment permits the motor side sensor 115 to be correctly positioned to make accurate measurements of the motor side target 105.

The joint 100 further comprises a joint side target 145 that is held in place by a joint side target holder 150. For example, the joint side target 145 comprises a joint side magnet 145. For example, the joint side target 145 comprises a joint side optical target 105. For example, the joint side target 145 comprises a joint side capacitive target 145. For example, the joint side target 145 comprises a joint side resolver target 145.

As the joint side target 145 moves, its position and therefore its velocity are detected by a joint side sensor 101 that is operably connected to the controller 120. For example, the joint side sensor 101 comprises a joint side position sensor 101. For example, the joint side sensor 101 comprises a joint side absolute position sensor 101. For example, the joint side sensor 101 comprises a joint side magnetic sensor 101. For example, the joint side sensor 101 comprises a joint side absolute magnetic position sensor 101. For example, the joint side sensor 101 comprises one or more of a joint side optical sensor 101, a joint side magnetic sensor 101, a joint side capacitive sensor 101, and a joint side resolver 101.

A joint side output plate 154 is connected to a joint side drive shaft 158. The joint side drive shaft 158 runs through a center of the motor 103. The joint side output plate 154 drives a joint side drive shaft 158. The joint side drive shaft 158 rotates about the central axis 104.

The joint side target 145 is mounted to a joint side target pulley 159. For example, the joint side target pulley 159 is configured to align the joint side target 145 with the joint side sensor 101. The joint side target pulley 159 is coupled to the joint side drive shaft 158 through a joint side pulley belt 160, which is driven by a joint side drive pulley 161 that is operably connected to the joint side drive shaft 158.

For example, the joint side pulley belt 160 is configured so that when the joint side pulley belt 160 is tensioned, the joint side target 145 aligns directly below the joint side sensor 101. For example, the joint side pulley belt 160 is sized so that when the joint side pulley belt 160 is tensioned, the joint side target 145 aligns directly below the joint side sensor 101. This alignment permits the joint side sensor 101 to be correctly positioned to make accurate measurements of one or more of the position and the velocity of the joint side target 145.

The motor side target pulley 125 and the motor side drive pulley 140 may have a belt pulley ratio other than 1:1. In particular, if the motor 103 is of a brushless DC type, it is beneficial but not necessary for the number of motor magnetic pole pairs multiplied by a motor side target pulley ratio to comprise an integer value. For instance, if the motor 103 had six magnetic pole pairs and the motor side target pulley ratio was 2:3, the value 6*(2/3)=4 would be an integer value. To efficiently commutate the permanent magnet brushless motor 103, using the position measurements made according to embodiments of the invention, an electrical angle of the motor 103 can be accurately determined using the measurement by the motor side sensor 115 of the position of the motor 103.

The joint 100 further comprises a slipring 179 positioned concentrically inside the joint side drive shaft 158. The slipring 179 comprises two sections that can rotate independently about the central axis 104, an upper slipring section 179A and a lower slipring section 179B. As depicted, the upper slipring section 179A is mechanically coupled to the joint input side of the joint 100 via the controller 120. The upper slipring section 179A could alternatively be mechanically coupled to the joint input side of the joint 100 via another component located on the joint input side of the joint 100. The lower slipring section 179B is mechanically coupled via the joint side drive shaft 158 to the joint side output plate 154.

One or more of electrical power and electrical signals pass between the upper slipring section 179A and the lower slipring section 179B. For example, the upper slipring section 179A does not rotate about the central axis 104. For example, the bottom slipring section 179B rotates with the joint side drive shaft 158 about the central axis.

The motor 103 drives the input of the gearbox 185. The output of the gearbox 185 drives the joint side drive shaft 158. Typically, although not necessarily, the gearbox 185 does one or more of reduce the speed of the motor 103 and increase the torque of the motor 103 by a gear ratio. For example, for a robotic arm joint, the gear ratio may be approximately 100:1. Such gear ratios facilitate more accurate measurements of a position of the motor 103 and thus a more accurate estimate of the velocity of the joint side target 145.

The speed-reduced output of the gearbox 185 is coupled to the joint side output plate 154. The joint side output plate 154 and the joint side drive shaft 158 rotate around the central axis 104. For example the gearbox 185 comprises a harmonic gearbox 185. For example, the gearbox 185 comprises a planetary gearbox 185. For example the gearbox 185 comprises another type of gearbox 185. A movable arm joint clamp 192 attaches to a fixed arm joint clamp 194 to hold the joint side drive shaft 158 onto the joint side output plate 154.

In the joint 100, both pulley pairs—the motor side target pulley 125 combined with the motor side drive pulley 140, and the joint side target pulley 159 combined with the joint side drive pulley 161—effectively move a center of rotation so it can be measured with an on-axis sensor that is not located on the central axis 104 of the joint 100 but rather is located on a respective side axis, the joint side axis 102 or the motor side axis 116.

The motor side target pulley 125 and the motor side drive pulley 140 are used to effectively move a center of rotation of the motor 103 so the motor 103 can be measured with a motor side sensor 115 that is not located on the central axis 104 of the joint 100 but rather is located on the motor side axis 116. Similarly, the joint side target pulley 159 and the joint side drive pulley 161 are used to effectively move a center of rotation of the joint side output plate 154 so that a position of the joint 100 can be measured by measuring a position of the joint side target 145 with a joint side sensor 101 that is not located on the central axis 104 of the joint 100 but rather is located on the joint side axis 102.

Figure 1B:
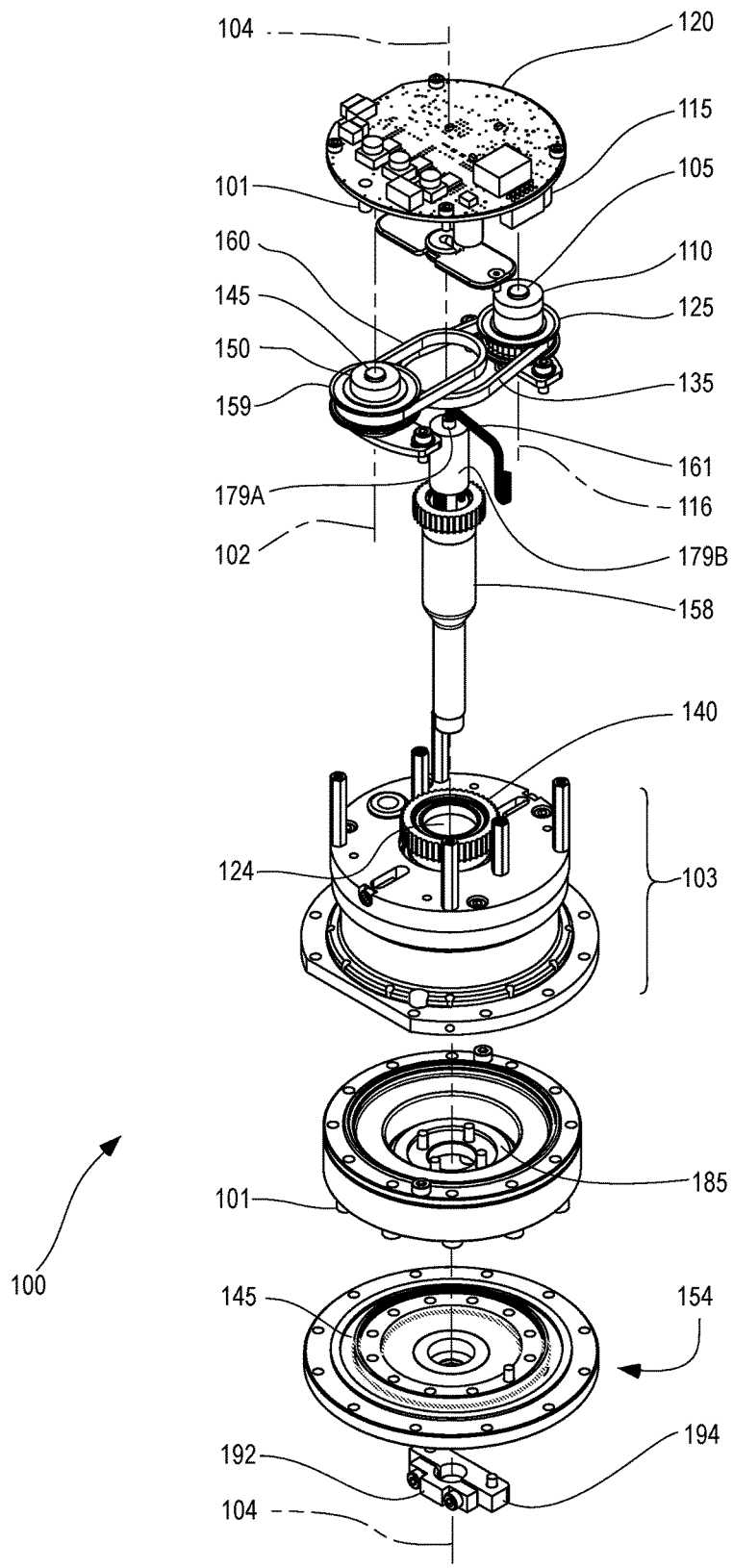
FIG. 1B is a drawing showing an exploded view of components of the robotic rotary joint in the first embodiment in which the joint side sensor is located on the central axis of the joint.

FIG. 1B is a drawing showing an exploded view of components of the robotic rotary joint 100 in the first embodiment in which the joint side sensor 101 is located on the joint side axis 102 of the joint 100. Also depicted are the motor 103, the central axis 104, the motor side target 105, the motor side target holder 110, the motor side sensor 115, the motor side axis 116, the controller 120, the motor side drive shaft 124, the motor side target pulley 125, the motor side pulley belt 135, the motor side drive pulley 140, the joint side target 145, the joint side target holder 150, the joint side output plate 154, the joint side drive shaft 158, the joint side target pulley 159, the joint side pulley belt 160, the joint side drive pulley 161, the slipring 179, the upper slipring section 179A, the lower slipring section 179B, the gearbox 185, the movable arm joint clamp 192, and the fixed arm joint clamp 194.

Figure 2A:
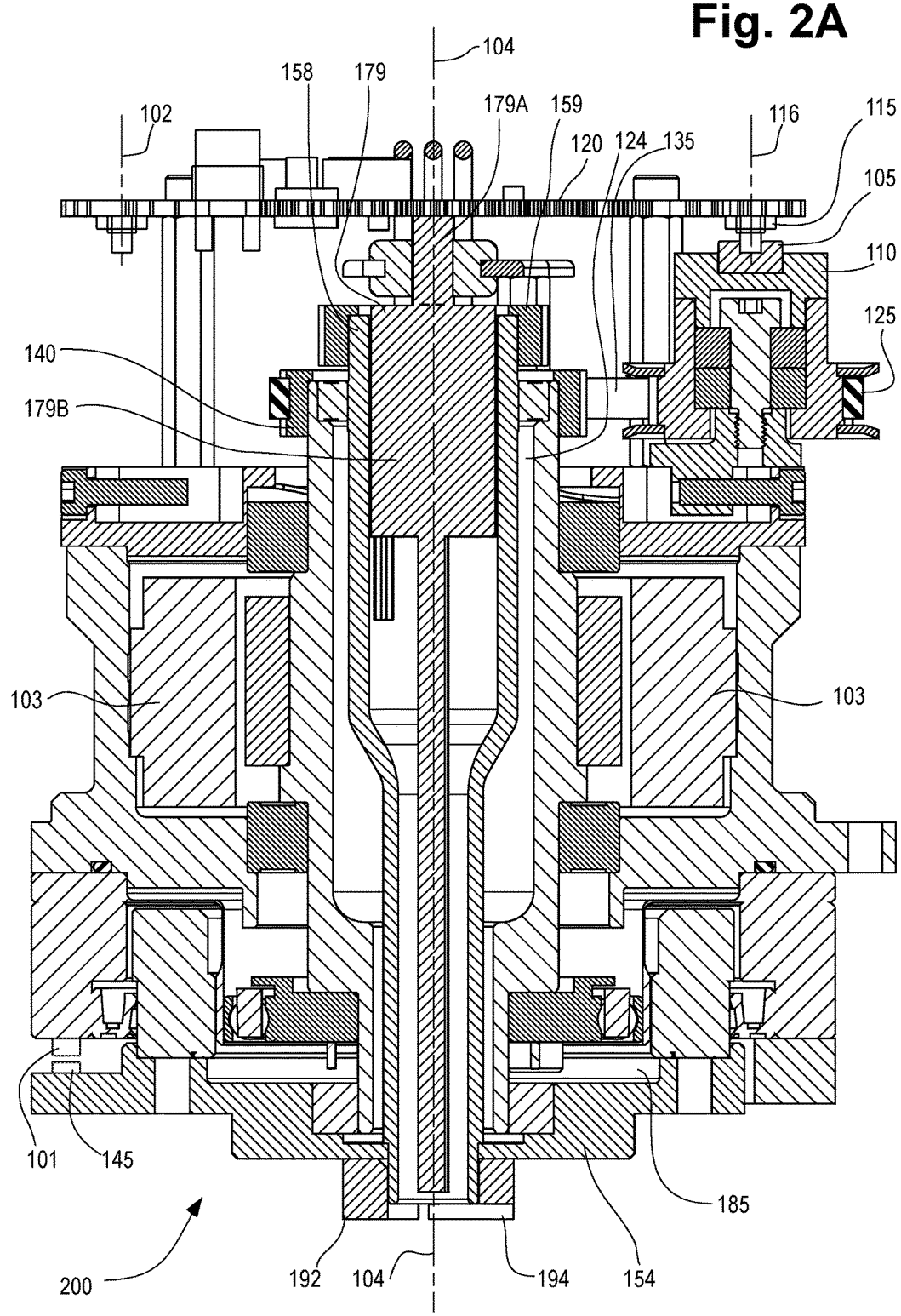
FIG. 2A is a drawing showing a side view of components of a robotic rotary joint in a second embodiment in which the joint side sensor is located off the central axis of the joint.

FIG. 2A is a drawing showing components of a robotic rotary joint 200 in a second embodiment in which the joint side sensor 101 is located off the central axis 104 of the joint 200. In the second embodiment, the joint side target 145 is approximately shaped like a ring centered on the central axis 104. Because of this, the joint side target pulley 159 and the joint side drive pulley 161 are not needed, and accordingly there is also no joint side pulley belt 160 in the second embodiment.

In the second embodiment, the motor side target pulley 125 and the motor side drive pulley 140 are used, as in the first embodiment, to effectively move a center of rotation of the motor 103 so the motor 103 can be measured with a motor side sensor 115 that is not located on the central axis 104 of the joint 100 but rather is located on the motor side axis 116. In the second embodiment, the joint side output plate 154 performs the functions performed in the first embodiment by the joint side target holder 150, so there is also no joint side target holder 150 in this embodiment.

Also depicted are the joint side axis 102, the motor side target 105, the motor side target holder 110, the controller 120, the motor side drive shaft 124, the motor side pulley belt 135, the joint side output plate 154, the joint side drive shaft 158, the slipring 179, the upper slipring section 179A, the lower slipring section 179B, the gearbox 185, the movable arm joint clamp 192, and the fixed arm joint clamp 194.

Figure 2B:
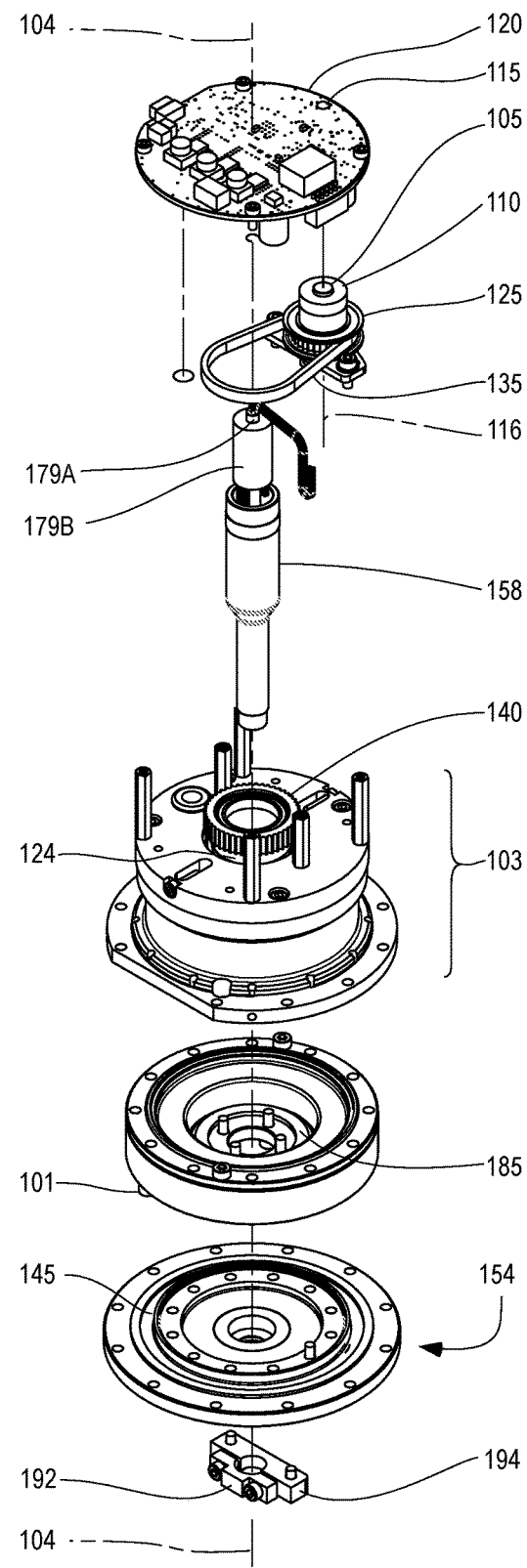
FIG. 2B is a drawing showing an exploded view of components of the robotic rotary joint in the second embodiment in which the joint side sensor is located off the central axis of the joint.

FIG. 2B is a drawing showing an exploded view of components of the robotic rotary joint 200 in a second embodiment in which the joint side sensor 101 is located off the central axis 104 of the joint 200. Also depicted are the motor 103, the central axis 104, the motor side target 105, the motor side target holder 110, the motor side sensor 115, the motor side axis 116, the controller 120, the motor side drive shaft 124, the motor side target pulley 125, the motor side pulley belt 135, the motor side drive pulley 140, the joint side target 145, the joint side output plate 154, the joint side drive shaft 158, the slipring 179, the upper slipring section 179A, the lower slipring section 179B, the gearbox 185, the movable arm joint clamp 192, and the fixed arm joint clamp 194.

Advantages of embodiments of the invention may include that the second embodiment comprises fewer components and thus may be one or more of less expensive and more robust. The second embodiment has another advantage that performing the joint measurement on the outside of the mechanism eliminated a large belt and pulley coupling mechanism, thereby freeing up more space at the center of the device. An advantage of the first embodiment is that an off-axis sensor is usually more costly and has fewer options relative to the on-axis sensor used by the first embodiment. Another advantage of the first embodiment is that the on-axis sensor allows the most accurate measurements. Another advantage of embodiments of the invention is that they facilitate torque control by enabling a determination of the exact orientation of a permanent magnet, so that it can be determined which electromagnets should be turned on next in a brushless system.

Sensors that measure the position of the motor and of the joint side output plate provide certain advantages by avoiding one or more of high noise, low resolution, and delay of calculations of velocity carried out by dividing a change in a position sensed by a position sensor by time over which the position changed. Another advantage is providing velocity estimates that provide a good combination of accuracy and responsiveness. Another advantage is that high gear ratios facilitate more accurate measurements of a position of the motor and thus a more accurate estimate of the velocity of the motor. Another advantage of embodiments of the invention is that directly measuring the joint output position facilitates greater accuracy of measurements of a position of the joint output.

Another advantage of embodiments of the invention is that directly measuring the joint output position avoids problems associated with measuring the joint output based on the motor position. These problems include one or more of backlash of gearheads, flexing between gearhead input and output, and different forces applied to the gearhead output relative to the gearhead input. Another advantage of directly measuring the joint output position is that problems are thereby avoided of determining a joint angle from a number of motor revolutions when power to the joint side sensor is shut off.

For example, it will be understood by those skilled in the art that software used by the robotic rotary joint may be located in any location in which it may be accessed by the system. It will be further understood by those of skill in the art that the number of variations of the network, the location of the software, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A joint comprising:
   a motor coupled to the joint, the motor configured to move the joint;
   a joint side sensor configured to measure a parameter of interest of a joint side target, wherein the parameter of interest comprises one of more of a position of the robotic joint, a velocity of the robotic joint, an acceleration of the robotic joint, and another parameter of interest;
   a motor side sensor configured to measure the parameter of interest of the motor; and
   a controller configured to control the motor, the controller operably connected to the joint side sensor, the controller operably connected to the motor side sensor, wherein the controller assigns greater weight to the position measured by the joint side sensor relative to the position measured by the motor side sensor.

2. A joint comprising:
   a motor coupled to the joint, the motor configured to move the joint;
   a joint side sensor configured to measure a parameter of interest of a joint side target, wherein the parameter of interest comprises one of more of a position of the robotic joint, a velocity of the robotic joint, an acceleration of the robotic joint, and another parameter of interest;
   a motor side sensor configured to measure the parameter of interest of the motor; and
   a controller configured to control the motor, the controller operably connected to the joint side sensor, the controller operably connected to the motor side sensor, wherein the controller assigns greater weight to the velocity measured by the motor side sensor relative to the velocity measured by the joint side sensor.

3. A joint comprising:
   a motor coupled to the joint, the motor configured to move the joint, wherein the motor comprises a brushless direct current (DC) motor, wherein the motor drives a hollow motor side drive shaft via a motor side drive pulley that is operably connected to the motor side drive shaft;

a joint side sensor configured to measure a parameter of interest of a joint side target, wherein the parameter of interest comprises one of more of a position of the robotic joint, a velocity of the robotic joint, an acceleration of the robotic joint, and another parameter of interest;

a motor side sensor configured to measure the parameter of interest of the motor; and a controller configured to control the motor, the controller operably connected to the joint side sensor, the controller operably connected to the motor side sensor; and a motor side target that is operably connected to the motor, the motor side target being mounted to a motor side target pulley, wherein the motor side target pulley is configured to bring the motor side target into detection range of the motor side sensor.

4. A joint comprising:

a motor coupled to the joint, the motor configured to move the joint, wherein the motor comprises a brushless direct current (DC) motor, wherein the motor drives a hollow motor side drive shaft via a motor side drive pulley that is operably connected to the motor side drive shaft;

a joint side sensor configured to measure a parameter of interest of a joint side target, wherein the parameter of interest comprises one of more of a position of the robotic joint, a velocity of the robotic joint, an acceleration of the robotic joint, and another parameter of interest;

a motor side sensor configured to measure the parameter of interest of the motor; and a controller configured to control the motor, the controller operably connected to the joint side sensor, the controller operably connected to the motor side sensor; and a motor side target that is operably connected to the motor, the motor side target being mounted to a motor side target pulley, wherein the motor side target pulley is configured to align the motor side target with the motor side sensor.

5. A joint comprising:

a motor coupled to the joint, the motor configured to move the joint, wherein the motor comprises a brushless direct current (DC) motor, wherein the motor drives a hollow motor side drive shaft via a motor side drive pulley that is operably connected to the motor side drive shaft;

a joint side sensor configured to measure a parameter of interest of a joint side target, wherein the parameter of interest comprises one of more of a position of the robotic joint, a velocity of the robotic joint, an acceleration of the robotic joint, and another parameter of interest;

a motor side sensor configured to measure the parameter of interest of the motor; and a controller configured to control the motor, the controller operably connected to the joint side sensor, the controller operably connected to the motor side sensor; and a motor side target that is operably connected to the motor, the motor side target being mounted to a motor side target pulley, wherein the motor side target pulley is coupled to the motor side drive shaft through a motor side pulley belt.

6. A joint comprising:

a motor coupled to the joint, the motor configured to move the joint, wherein the motor comprises a brushless direct current (DC) motor, wherein the motor drives a hollow motor side drive shaft via a motor side drive pulley that is operably connected to the motor side drive shaft;

a joint side sensor configured to measure a parameter of interest of a joint side target, wherein the parameter of interest comprises one of more of a position of the robotic joint, a velocity of the robotic joint, an acceleration of the robotic joint, and another parameter of interest;

a motor side sensor configured to measure the parameter of interest of the motor; and a controller configured to control the motor, the controller operably connected to the joint side sensor, the controller operably connected to the motor side sensor; and a motor side target that is operably connected to the motor, the motor side target being mounted to a motor side target pulley, wherein the motor side target pulley is coupled to the motor side drive shaft through a motor side pulley belt, wherein the motor side sensor is located on an axis that does not comprise a central axis of the joint.

7. A joint comprising:

a motor coupled to the joint, the motor configured to move the joint, wherein the motor comprises a brushless direct current (DC) motor, wherein the motor drives a hollow motor side drive shaft via a motor side drive pulley that is operably connected to the motor side drive shaft;

a joint side sensor configured to measure a parameter of interest of a joint side target, wherein the parameter of interest comprises one of more of a position of the robotic joint, a velocity of the robotic joint, an acceleration of the robotic joint, and another parameter of interest;

a motor side sensor configured to measure the parameter of interest of the motor, wherein the motor side sensor is located on an axis that does not comprise a central axis of the joint; and a controller configured to control the motor, the controller operably connected to the joint side sensor, the controller operably connected to the motor side sensor; and a motor side target that is operably connected to the motor, the motor side target being mounted to a motor side target pulley, wherein the motor side target pulley is coupled to the motor side drive shaft through a motor side pulley belt, wherein the motor side sensor is located on an axis that does not comprise a central axis of the joint, wherein a joint side drive pulley drives the joint side pulley belt.

8. A joint comprising:

a motor coupled to the joint, the motor configured to move the joint;

a joint side sensor configured to measure a parameter of interest of a joint side target, wherein the joint side target is mounted to a joint side target pulley;

a motor side sensor configured to measure the parameter of interest of the motor; and a controller configured to control the motor, the controller operably connected to the joint side sensor, the controller operably connected to the motor side sensor, wherein the joint side target pulley is configured so that it brings the joint side target into detection range of the joint side sensor.

9. A joint comprising:

a motor coupled to the joint, the motor configured to move the joint;

a joint side sensor configured to measure a parameter of interest of a joint side target, wherein the joint side target is mounted to a joint side target pulley;

a motor side sensor configured to measure the parameter of interest of the motor; and a controller configured to control the motor, the controller operably connected to the joint side sensor, the controller operably connected to the motor side sensor, wherein the joint side target pulley is configured to align the joint side target with the joint side sensor.

10. A joint comprising:

a motor coupled to the joint, the motor configured to move the joint;

a joint side sensor configured to measure a parameter of interest of a joint side target, wherein the joint side target is mounted to a joint side target pulley, wherein the joint side target pulley is configured so that it brings the joint side target into detection range of the joint side sensor;

a motor side sensor configured to measure the parameter of interest of the motor; and a controller configured to control the motor, the controller operably connected to the joint side sensor, the controller operably connected to the motor side sensor, wherein the joint side target pulley is coupled to a joint side drive shaft through a joint side pulley belt.

11. A joint comprising:

a motor coupled to the joint, the motor configured to move the joint;

a joint side sensor configured to measure a parameter of interest of a joint side target, wherein the joint side target is mounted to a joint side target pulley, wherein the joint side target pulley is configured so that it brings the joint side target into detection range of the joint side sensor;

a motor side sensor configured to measure the parameter of interest of the motor; and a controller configured to control the motor, the controller operably connected to the joint side sensor, the controller operably connected to the motor side sensor, wherein the joint side target pulley is coupled to a joint side drive shaft through a joint side pulley belt, wherein the joint side drive shaft runs through a center of the motor.

12. A joint comprising:

a motor coupled to the joint, the motor configured to move the joint;

a joint side sensor configured to measure a parameter of interest of a joint side target, wherein the joint side target is mounted to a joint side target pulley, wherein the joint side target pulley is configured so that it brings the joint side target into detection range of the joint side sensor;

a motor side sensor configured to measure the parameter of interest of the motor; and a controller configured to control the motor, the controller operably connected to the joint side sensor, the controller operably connected to the motor side sensor, wherein the joint side target pulley is coupled to a joint side drive shaft through a joint side pulley belt, wherein the joint side drive shaft runs through a center of the motor, wherein a joint side output plate drives the joint side drive shaft.

13. A joint comprising:

a motor coupled to the joint, the motor configured to move the joint;

a joint side sensor configured to measure a parameter of interest of a joint side target, wherein the joint side target is mounted to a joint side target pulley, wherein the joint side target pulley is configured so that it brings the joint side target into detection range of the joint side sensor;

a motor side sensor configured to measure the parameter of interest of the motor; and a controller configured to control the motor, the controller operably connected to the joint side sensor, the controller operably connected to the motor side sensor, wherein the joint side target pulley is coupled to a joint side drive shaft through a joint side pulley belt, wherein the joint side drive shaft runs through a center of the motor, wherein a joint side output plate drives the joint side drive shaft, wherein the joint side target pulley is coupled to the joint side drive shaft through a joint side pulley belt.

14. A joint comprising:

a motor coupled to the joint, the motor configured to move the joint;

a joint side sensor configured to measure a parameter of interest of a joint side target, wherein the joint side target is mounted to a joint side target pulley, wherein the joint side target pulley is configured so that it brings the joint side target into detection range of the joint side sensor;

a motor side sensor configured to measure the parameter of interest of the motor; and a controller configured to control the motor, the controller operably connected to the joint side sensor, the controller operably connected to the motor side sensor, wherein the joint side target pulley is coupled to a joint side drive shaft through a joint side pulley belt, wherein the joint side drive shaft runs through a center of the motor, wherein a joint side output plate drives the joint side drive shaft, wherein the joint side target pulley is coupled to the joint side drive shaft through a joint side pulley belt, wherein a joint side drive pulley drives the joint side pulley belt.

15. A joint comprising:

a motor coupled to the joint, the motor configured to move the joint;

a joint side sensor configured to measure a parameter of interest of a joint side target, wherein the joint side target is mounted to a joint side target pulley, wherein the joint side target pulley is configured so that it brings the joint side target into detection range of the joint side sensor;

a motor side sensor configured to measure the parameter of interest of the motor; and a controller configured to control the motor, the controller operably connected to the joint side sensor, the controller operably connected to the motor side sensor, wherein the joint side target pulley is coupled to a joint side drive shaft through a joint side pulley belt, wherein the joint side drive shaft runs through a center of the motor, wherein a joint side output plate drives the joint side drive shaft, wherein the joint side target pulley is coupled to the joint side drive shaft through a joint side pulley belt, wherein a joint side drive pulley drives the joint side pulley belt, wherein the joint side sensor is located on an axis that does not comprise a central axis of the joint.

16. A joint, comprising:

a slipring;

a motor coupled to the joint, the motor configured to move the joint, the motor driving a hollow motor side drive shaft;

a joint side sensor configured to measure a parameter of interest of a joint side target, the joint side target mounted to a joint side target pulley, the joint side target pulley coupled to a joint side drive shaft, the joint side drive shaft concentrically surrounding the slipring;

a motor side sensor configured to measure the parameter of interest of the motor; and a controller configured to control the motor, the controller operably connected to the joint side sensor, the controller operably connected to the motor side sensor, wherein the motor side drive shaft concentrically surrounds the joint side drive shaft.

17. The joint of claim 16, wherein the joint side target is approximately shaped like a ring centered on a central axis of the joint.

18. The joint of claim 16, wherein the motor side sensor located on an axis that does not comprise a central axis of the joint.

19. The joint of claim 16, wherein the joint side sensor is located on an axis that does not comprise a central axis of the joint.

20. A robotic rotary joint, comprising:

a motor coupled to the joint, the joint having a central axis, the motor driving a hollow motor side drive shaft via a motor side drive pulley that is operably connected to the motor side drive shaft;

a joint side sensor coupled to a joint side target, the joint side sensor configured to sense a parameter of interest, the joint side target mounted to a joint side target pulley, the joint side target pulley coupled to a joint side drive shaft;

a motor side sensor coupled to a motor side target that is operably connected to the motor, the motor side sensor configured to sense the parameter of interest, the motor side target being mounted to a motor side target pulley, the motor side target pulley configured to align the motor side target with the motor side sensor, the motor side target pulley coupled to the motor side drive shaft through a motor side pulley belt; and a controller configured to control the motor, the controller operably connected to the joint side sensor, the controller operably connected to the motor side sensor, wherein the motor side drive shaft concentrically surrounds the joint side drive shaft, and wherein the joint side sensor is located on an axis that does not comprise the central axis.

21. The joint of claim 20, wherein the joint side target is approximately shaped like a ring centered on the central axis.

22. The joint of claim 20, wherein the motor side sensor is located on an axis that does not comprise the central axis.

* * * * *

UNITED STATES PATENT AND TRADEMARK OFFICE
CERTIFICATE OF CORRECTION

PATENT NO. : 9,827,668 B2
APPLICATION NO. : 15/130696
DATED : November 28, 2017
INVENTOR(S) : Derek King It is certified that error appears in the above-identified patent and that said Letters Patent is hereby corrected as shown below:

On the Title Page

Please add item (60) "Related U.S. Application Data" as follows:
"Provisional application No. 62/147,785, filed on April 15, 2015."

Signed and Sealed this
Twenty-third Day of August, 2022

Katherine Kelly Vidal
*Director of the United States Patent and Trademark Office*